(12) United States Patent
Barmentloo et al.

(10) Patent No.: US 12,432,821 B2
(45) Date of Patent: Sep. 30, 2025

(54) FOIL HEATERS FOR BULK CONTAINERS

(71) Applicant: Argus Heating Limited, Christchurch (NZ)

(72) Inventors: Evert Jan Barmentloo, Rangiora (NZ); Scott Alexander Williams, Christchurch (NZ)

(73) Assignee: Argus Heating Limited, Christchurch (NZ)

( * ) Notice: Subject to any disclaimer, the term of this patent is extended or adjusted under 35 U.S.C. 154(b) by 755 days.

(21) Appl. No.: 17/843,941

(22) Filed: Jun. 17, 2022

(65) Prior Publication Data

US 2023/0413392 A1 Dec. 21, 2023

(30) Foreign Application Priority Data

Jun. 15, 2022 (NZ) .................................. 789424

(51) Int. Cl.
*H05B 3/56* (2006.01)
*B65D 88/74* (2006.01)
*G05D 23/19* (2006.01)
*H05B 1/02* (2006.01)

(52) U.S. Cl.
CPC .............. *H05B 3/56* (2013.01); *B65D 88/74* (2013.01); *G05D 23/1928* (2013.01); *H05B 1/023* (2013.01)

(58) Field of Classification Search
CPC ........ H05B 2203/003; H05B 2203/014; H05B 2203/017; H05B 3/34; H05B 3/36; H05B 3/56; H05B 1/0275; H05B 2203/021; H05B 2203/007; H05B 2203/013; H05B 2203/022; H05B 3/04; H05B 3/342; H05B 3/565; H05B 1/0244; H05B 2203/008; H05B 2203/016; H05B 2203/026; H05B 2203/029; H05B 3/42; H05B 1/023; H05B 1/0236; H05B 2203/004; H05B 2203/005; H05B 2203/032; H05B 2214/02; H05B 3/00; H05B 3/06; H05B 3/145; H05B 3/265; H05B 3/267; H05B 3/347; F24H 1/185; F24H 9/02; F24H 9/1818; G01K 1/08; G01K 13/006; G01K 13/028; G01K 2203/00
USPC ....... 219/528, 529, 212, 213, 494, 531, 545, 219/549, 162, 202, 211, 432, 489, 492, 219/505, 526, 530, 533, 536, 539, 543, 219/544, 548, 552; 162/46
See application file for complete search history.

(56) References Cited

U.S. PATENT DOCUMENTS 5,974,820 A * 11/1999 Boyd .................. H05B 3/00 219/529
2021/0130086 A1* 5/2021 Russell ............... B65D 88/744
2022/0322498 A1* 10/2022 Reevell .................. A24F 40/51

\* cited by examiner

*Primary Examiner* — Vy T Nguyen
(74) *Attorney, Agent, or Firm* — Lowe Graham Jones PLLC

(57) ABSTRACT

The present invention relates to thin foil heater. In particular, though not solely, the present invention is directed to foil heaters or slip pads for Intermediate Bulk Containers (IBC) and the like.

3 Claims, 12 Drawing Sheets

FOIL HEATERS FOR BULK CONTAINERS

PRIORITY CLAIM

This application claims the benefit of priority from New Zealand Patent Application No. 789424 filed Jun. 15, 2022, the contents of which is incorporated herein by reference.

FIELD OF THE INVENTION

The present invention relates to thin foil heater. In particular, though not solely, the present invention is directed to foil heaters or slip pads for Intermediate Bulk Containers (IBC) and the like.

BACKGROUND OF THE INVENTION

When moving product in bulk there is often a need to heat that product, for example when the product is a solid, or near solid when at ambient temperature, to change the viscosity, or phase of the product to a liquid, to enable ease of decanting or removal from the container it is in once the container reaches its destination, including after a period in storage. In addition, there may simply be the desire the heat the product up to a desired temperature prior to using it, even if in a liquid state at ambient temperature.

There have been many solutions to date. The main area of these is to provide a heater on the exterior of the container. The main solution utilized is a thin heater pad or blanket, typically as a foil heater this sits underneath the container, often sandwiched between the container and the packing or transport pallet it is located on. The weight of the material in the container, pressing down onto the foil heater provides good heat conduction, compared to a foil heater or blanket wrapped around the container. A foil heater in this location is also substantially protected by the container and product above it, and the pallet or similar below it. In contrast a heater blanket around the container has less protection and heat conduction into the container when constructed in the same manner as a foil heater. To improve protection and heat conduction of a heater blanket requires additional material and production which adds cost, complexity and weight.

Sometimes the containers with the material in may sit for many months, or even years until needed, for example in a cool store. The content of the container may be $1,000 or $10,000 worth and is valuable. If the foil heater fails by not working to heat the material when necessary, this is not desirable. This is because the container may weigh several tons and may not be robust enough to be lifted separately for the foil heater to be replaced. Further, if the foil heater overheats, for example by a short circuit or by going over temperature, then it may locally overheat the product, resulting in a tainted or damaged product thus making that product unusable, at least for the intended purpose. It is worse still if the foil heater burns or catches on fire and damages not only the product it is for, but also surrounding product and any facilities.

The foil heater may also be required to heat the container several times. For example, only some of the material may be drawn off and used and the container allowed to cool down again. The foil heater then may be turned on again to heat the material at another time for further material removal.

Therefore, the foil heater must be reliable over many environments, time frames and uses.

Foil heaters to date have largely been in two forms, both using electrical energy converted to thermal energy using a heating cable. The heating cable is laid out in a flat shape of the desired size and is connectable to a source of electricity. The first form is a simple laminate of paper or similar either side of the heater cable circuit to hold the heater cable in the correct orientation.

To protect the foil heater, and the content it is to heat there are often one or more thermostats, typically located in the foil heater. These will interrupt the flow of electrical energy when a certain temperature is met by the thermostat. This can prevent overheating of the container and product, and also prevent fire or similar burning damage. Typically, there is a product thermostat that is set to a first temperature to allow the product to melt and achieve the target temperature whilst avoiding overheating. A second product thermostat which has a slightly higher temperature setting is installed as a backup. There is also often a non-resetting thermal fuse set to a third temperature to protect from an overheating scenario, above which set temperature there may be damage or failure of the components of the foil heater, pallet it rests on, container, or material therein, or other items. The third temperature is greater than the second temperature.

During normal operation the foil heater sitting under a container holding material to be heated, for example for decanting, is connected to a source of power. The full container and contents are then heated by the foil heater. When the content has reached the target temperature the product thermostat in the foil heater will cycle power to maintain product temperature. Once the user is ready to empty the container, the foil heater is turned off, and the material required is removed.

If the container is fully emptied, but the foil heater is unintentionally left on by the user the foil heater surface temperature will rise as there is no product to absorb the thermal energy. Lack of product to absorb the energy also means there is no path for heat transfer to the product thermostat. The lack of material in the container to absorb the thermal energy will lead to hotspots. As a result, the non-resetting thermal fuse incorporated in the heater surface will be activated/open. The heater is now permanently disabled and no longer functional.

However, there is a further situation between these two where nearly all of the material is removed from the container, but some content remains. This may happen where there is insufficient time to empty the container, care is not taken, or there the contents are highly viscous and a layer remains adhered to the container inner walls, and then over time with gravity comes to rest on the bottom of the container in a thin layer.

In this situation the product thermostat to control the temperature of the container content will only function in case there is a minimum set amount, for example for an Intermediate Bulk Container (IBC), typically of 1000 liters in volume the product thermostat requires of 100 liters present in the IBC to operate. This will not operate when there is a thin layer of material present of less than 100 liters volume. Therefore, this will not provide protection.

Similarly, the non-resetting thermal fuse will not open for some time as there is still a small amount of product in the IBC to absorb the energy. As a result, the product temperature will keep rising until the thermal fuse temperature is reached and the heater is disabled.

The above situation is safe in the sense that the heater is disabled before a dangerous situation arises. However, this is still considered unsafe in some markets and outside ideal and standard operating procedures, for example where the plastic liner bag or underlying cardboard can only be exposed to a maximum temperature of say 90° C. Reducing the non-resetting thermal fuse set point (third temperature) will not work as this will bring it too close to the product thermostat set point (first temperature) and result in undesirable thermal tripping.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The present invention provides an improved foil heater, or overcomes the above shortcomings or addresses the above *desiderata*, or at least provides the public with a useful choice.

SUMMARY OF THE INVENTION

In a first aspect the present invention may be said to broadly consist in a thin foil heater to heat a material in a bulk container, comprising or including, A lower backing layer of a metallic foil, having substantially the same plan area as the underside of the bulk container to be heated, A heating cable laid out on an upper facing surface of the lower backing layer to form a heating circuit to deliver thermal energy when connected to an external source of electricity, the heating cable equally spaced over the upper facing surface, A first thermostat, which interrupts electricity to the heating cable when it detects a temperature of the material above a first set temperature, and which re-connects electricity to the heating cable when it detects the temperature is below the first set temperature, the first thermostat located sufficiently away from the heating cable, to not directly sense the thermal energy from the heating cable, A second thermostat, in series connection with the first thermostat, which interrupts electricity to the heating cable when the temperature detected is above a second set temperature, A non-resetting thermal fuse, in series connection with the first and second thermostat, which interrupts electricity to the heating cable when the temperature detected is above a third set temperature, An upper backing layer of a metallic foil, having substantially the same plan area as the underside of the bulk container to be heated, the lower backing layer and upper backing layer encapsulating the heating cable, first thermostat, second thermostat and non-resetting thermal fuse, and forming an interior between the upper backing layer and lower backing layer, An electrical connection for the heating cable, after the first and second thermostat, to the external source of electricity, the electrical connection including an earth connection from any conductive material of the foil heater, At least one cold region, the cold region defined by having no heating cable, first thermostat or second thermostat present, At least one region of high thermal resistance between the first thermostat, and the at least one cold region to prevent thermal energy from reaching the cold region until at least the first thermostat can reach the first set temperature, Such that a foil heater is provided that when connected to the external source of electricity will provide thermal energy to the container, and any material therein, the foil heater able to heat the container with a range of amounts of material, from full to empty and anywhere in between, within the container and safety cycle the first thermostat without tripping the second thermostat or thermal fuse, or an external surface temperature of the foil heater reaching a mandated safety temperature.

Preferably the cold region is at or near an outer edge of the foil heater.

Preferably the second thermostat is located sufficiently away from the heating cable, to not directly sense the thermal energy from the heating cable.

Preferably the non-resetting thermal fuse is located equidistant to two or more strands of heating cable.

Preferably the at least one region of high thermal resistance is also between the second thermostat and the cold region.

Preferably the mandated safety temperature is ninety (90) degrees Celsius.

Preferably the heating circuit is a pair of heating cables connected in parallel or series.

Preferably the bulk container is an intermediate bulk container (IBC), to carry the material.

Preferably the heating cables when connected in parallel allows for redundancy and continued operation should one heating cable of the pair in parallel be damaged.

Preferably the region of high thermal resistance takes the form of, any one or more of
  an aperture within, or forming part of, a periphery of the foil heater, located at least in part over the at least one cold region and between the heating cable or first and second thermostat and an edge of the foil heater,
  a section of insulating material, over at least part of the cold region within the periphery of the foil heater, or
  a physical barrier, minimum height 25 mm, that lifts the container away from the cold region at least over part of the cold region,
to prevent or reduce transmission of thermal energy from the heating cable to the cold region and any material therein.

Preferably the second set temperature is 10 degrees Celsius higher than the first set temperature.

Preferably the first set temperature is about 50 degrees Celsius (° C.) to 60° C. (product), preferably 62° C. and the second set temperature is about 60° C. to 80° C., preferably 70° C.

Preferably the third set temperature is in the range of 110° C. to 140° C. (thermal fuse).

Preferably the third set temperature is 129° C.

Alternatively, the region of high thermal resistance instead takes the form of a pressure switch within the periphery of the foil heater that disconnects the supply of electricity to the heating cable when the amount of material in the container is below a set threshold weight.

In another aspect the present invention may be said to broadly consist in a method of manufacture of a foil heater, adapted to heat a container with material there in, comprising or including,
  Providing a lower backing layer
  Applying a jig to the lower backing layer to provide a series of guide pins,
  Arranging a heating cable around the guide pins to provide a heating cable equally spaced on an upper face of the lower backing layer,
  Locating a first thermostat, second thermostat and thermal fuse electrically connected to the heating cable in series connection to a, Provided connection external to a periphery of the lower backing layer for an electrical connection to an external source of electricity for energizing the heating cable, Locating an upper backing layer over the lower backing layer to seal the heating cable therebetween, either the lower surface of the upper backing layer, or an upper surface of the lower backing layer having an adhesive coating, Removing the jig, The arrangement of heating cable, first thermostat and second thermostat providing at least one cold region, the cold region defined by having no heating cable, first thermostat or second thermostat present, and At least one region of high thermal resistance between the first thermostat, and the at least one cold region to prevent thermal energy from reaching the cold region until at least the first thermostat can reach the first set temperature, Such that a foil heater is provided that when connected to the external source of electricity will provide thermal energy to the container, and any material therein, the foil heater able to heat the container with a range of amounts of material, from full to empty and anywhere in between, within the container and safety cycle the first thermostat without tripping the second thermostat or thermal fuse, or an external surface temperature of the foil heater reaching a mandated safety temperature.

Preferably the jig is applied to an underside of the lower backing layer and perforates it with the guide pins.

Preferably the cold region is at or near an outer edge of the foil heater.

Preferably the second thermostat is located sufficiently away from the heating cable, to not directly sense the thermal energy from the heating cable.

Preferably the non-resetting thermal fuse is located equidistant to two or more strands of heating cable.

Preferably the at least one region of high thermal resistance is also between the second thermostat and the cold region.

Preferably the mandated safety temperature is ninety (90) degrees Celsius.

Preferably the heating circuit is a pair of heating cables connected in parallel or series.

Preferably the bulk container is an intermediate bulk container (IBC), to carry the material.

Preferably the heating cables when connected in parallel allows for redundancy and continued operation should one heating cable of the pair in parallel be damaged.

Preferably the region of high thermal resistance takes the form of, any one or more of an aperture within, or forming part of, a periphery of the foil heater, located at least in part over the at least one cold region and between the heating cable or first and second thermostat and an edge of the foil heater, a section of insulating material, over at least part of the cold region within the periphery of the foil heater, or a physical barrier, minimum height 25 mm, that lifts the container away from the cold region at least over part of the cold region, to prevent or reduce transmission of thermal energy from the heating cable to the cold region and any material therein.

Preferably the second set temperature is 10 degrees Celsius higher than the first set temperature.

Preferably the first set temperature is about 50 degrees Celsius (° C.) to 60° C. (product), preferably 62° C. and the second set temperature is about 60° C. to 80° C., preferably 70° C.

Preferably the third set temperature is in the range of 110° C. to 140° C. (thermal fuse).

Preferably the third set temperature is 129° C.

Alternatively, the region of high thermal resistance instead takes the form of a pressure switch within the periphery of the foil heater that disconnects the supply of electricity to the heating cable when the amount of material in the container is below a set threshold weight.

Preferably a sealing layer is applied to the underside of the lower backing layer to seal the perforations.

In yet another aspect the present invention may be said to broadly consist in a thin foil heater as described herein with reference to any one or more of the accompanying drawings.

In yet another aspect the present invention may be said to broadly consist in a container in combination with a foil heater against a lowermost surface of the container as described herein with reference to any one or more of the accompanying drawings.

In yet another aspect the present invention may be said to broadly consist in a method of manufacture of a foil heater as described herein with reference to any one or more of the accompanying drawings.

As used herein the term "and/or" means "and" or "or", or both. As used herein "(s)" following a noun means the plural and/or singular forms of the noun. The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7). The entire disclosures of all applications, patents and publications, cited above and below, if any, are hereby incorporated by reference.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which;

FIG. 1 shows an exploded view of an intermediate bulk container, foil heater of the present invention, and pallet for the foil heater and container to rest on;

DETAILED DESCRIPTION OF THE PREFERRED EMBODIMENT

Figure 1:
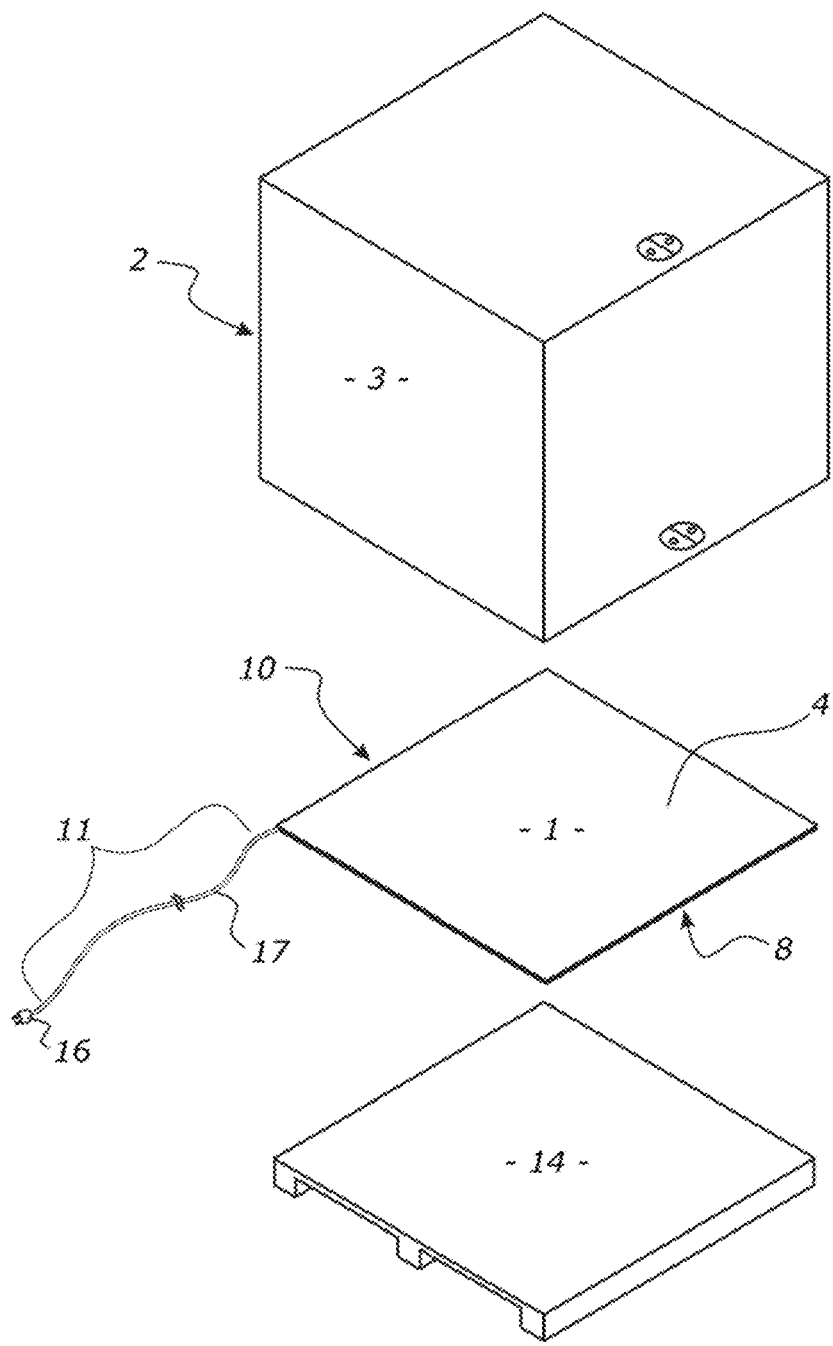

Preferred embodiments will now be described with reference to FIGS. 1-12.

A foil heater 1 of the present invention is located under a large container 2 of product, such as an intermediate bulk container, or IBC. The foil heater 1 contains all the heating elements, for example heater cable 5, and sensing elements such as product thermostat 30 and backup thermostat 41 (which cycle on and off) and thermal fuses 32 (which irreversibly blow when a certain temperature is reached). In the preferred form the heater cable 5 is a silicon insulation over a heating wire(s).

This is the most efficient form of heating the product while keeping the product hygienic and free of contamination as no heater or sensing element is placed in the product. Further the weight of the product down onto the foil heater 1 ensures high thermal conduction between the foil heater 1 and container 2 and hence into the product 3.

A safety requirement is that the external surface 4 and 8 of the foil heater 1 does not exceed a certain mandated safety temperature. This is to ensure there is no fire or similar risk. For example, a foil heater 1 surface temperature 4, 8 may not exceed a temperature of 90° C., under UL (Underwriters Laboratory) testing.

When heating an IBC 2 via a thin foil heater 1 the product temperature needs to be accurately measured to ensure product or material 3 melts but no further. When the product (first) thermostat 30 is in the foil heater 1 then to ensure optimal heating of the product 3, that is, fastest time with least energy, the product thermostat 30 must only, or mainly, measure the temperature, or thermal energy of the product 3. That is, the product thermostat 30 indirectly measures the temperature of the heating cable 5 via the product 3 in the IBC 2 the heater cable 5 is heating. If the product thermostat 30 is too close to the heater cable 5 it will directly measure or sense the heater cable 5 temperature instead of the product 3 temperature. This leads to inefficient heating of the product 3 as the product thermostat 30 will prematurely trip due to heater cable 5 temperature, instead of the product 3 temperature. In the preferred form the product thermostat 30 is chosen from an activation range (i.e. turning off) of between 50° C. to 60° C., and in the preferred form trips off at above 62° C.

Likewise, the second (backup) thermostat 41 is there in case the product thermostat 30 fails for any reason. In the preferred form this is chosen from an activation range (i.e. turning off) of between 60° C. to 80° C., and in the preferred form trips off at above 70° C. Likewise, if the backup thermostat 41 is too close to the heater cable 5 it will directly measure or sense the heater cable 5 temperature instead of backing up measuring of the product 3 temperature. This again can lead to inefficient heating of the product 3 as the backup thermostat 41 will prematurely trip due to heater cable 5 temperature, instead of the product 3 temperature.

Again, the trip or cycle temperatures of the product thermostat 30 and backup thermostat 41 are chosen to suit the material 3 to be heated.

One solution is to position the product thermostat 30 away from the heater cable in a "cold region" 31 of the foil heater 1, that is a region of the foil heater 1 with no heater cable and in, or near, which the product thermostat 30 resides. The heater cable 5 heats the product 3 in the IBC 2 and this heat is carried by the product 3 to the cold region 31 and sensed by the product thermostat 30, rather than the product thermostat 30 sensing the heat directly from the heating cable 5. This cold region 31 is shown in one location in FIG. 1, a region of foil heater 1 free of heater cable 5 so the product thermostat 30 only measures the product 3 temperature.

The heater cable 5 when energized heats the first and second external surfaces 4 and 8 of the foil heater 1. The thermal energy will then follow the path of least thermal resistance.

When the IBC 2 is full then the thermal energy moves into the product 3 in the IBC 2. From the product 3 it circulates and then is sensed by the product thermostat 30 as described above. The product thermostat 30 is therefore sensing the product 3 temperature in a feedback cycle and cycles on and off and controls the product 3 heating process. Due to the large thermal mass of the product 3 $t$ is not uncommon for such a heating process to take up to two full days. The product 3 reaches the desired temperature, and the outer surface of the foil heater 1 doesn't exceed the mandated safety temperature.

Likewise, when the IBC 2 is empty the temperature rise is detected by the thermal fuse 32 and the process is halted. Again, the outer surfaces 4 and 8 of the foil heater 1 won't exceed the mandated safety temperature, or not for any period of time to be of concern.

However, keeping the product thermostat 30 in the cold region 31 presents a problem when there is only a small amount of product in the IBC 2, in the amount of between and 50 mm, for example 25 mm in depth in a 1000 liter IBC 2. Such a residual amount of product 3, and thus a low thermal mass to heat may occur when the IBC 2 has been "emptied", that is the majority of the product 3 has been decanted, but there is sufficient product 3 sticking to the inside surface of the container 2 that it does not pour out, and then resettles on the base inside surface of the container 2, which is against the foil heater 1, which may accidentally be left on.

As soon as the foil heater 1 is powered up, the material 3 temperature will rise, but the product thermostat 30 temperature will be lagging as it is positioned in the or toward the cold region 31 away from the heater cable 5. Not only is the heat transfer to the product thermostat lagging, any thermostat temperature rise will also be subdued as heat will "leak" away towards the cold region 31, as the cold region 31 acts as a heat sink preventing the thermostats 30 and 41 from sensing the product 3 temperature within sufficient time to control the heating process. By the time the product thermostat 30 temperature starts rising, the temperature of the foil heater external surface 4 and/or 8 has already passed the mandated safety temperature. In one example this mandated safety temperature is 90° C., and is for example the maximum surface temperature limit set by Underwriters Laboratory (UL).

In this situation the path of least thermal resistance is not through the IBC 2 and into the product 3, as there is so little present, but rather through the backing layers (and any intermediate layers) of the foil heater 1. The thermal energy therefore cannot build up in the product 3 and the product thermostat 30 therefore does not sense the product temperature sufficient to cycle on and off. The product temperature stays below the trip temperature of the product thermostat, and hence it stays on, continuing to energize the thermal cable, which can lead to an over temperature event on the foil heater surface exceeding the mandated safety temperature.

Instead, the thermal energy moves away from the product 3 through the layers of the foil heater 1, laterally if you will, and into the cold region 31. In prior art products eventually, possibly, the thermal fuse equivalent would blow, but as the thermal fuse temperature is above the mandated safety temperature (if it wasn't then there is the risk the thermal fuse would blow when the IBC is full and being heated to the desired temperature) then an unsafe operating condition can occur, that is the foil heater surface temperature will exceed the mandated safety temperature, for example 90 degrees Celsius. The foil heater is eventually rendered inoperable and then the remaining, valuable, product in the IBC cannot be removed. This then requires either the product is wasted, or another foil heater, if available, has to be installed. This may not be possible with the weight of product 3 still in the IBC 2, especially if the IBC 3 is a thin flexible one, for example a bag.

The present invention will work in such a scenario and still stay under the mandated safety temperature. This is achieved by providing or allowing a faster product thermostat response, to achieve therefore product thermostat operation (that is cycling off) before the foil heater surfaces 4 and 8 reaches the safety limit.

The solution in the present invention therefore is to decrease the thermal conductivity into or surrounding the cold region 31, slowing its thermal rise, to below that moving into the product 3, and therefore the product temperature rises faster than the external surfaces in the cold region 31 and thus the product thermostat 30 can control the heating within safe operating parameters.

The general shape of one form of the foil heater 1, when located under a container 2 and above a pallet 14, is shown in FIG. 1. It should be understood that when the term container 2 is used, it can mean a rigid container within which the bulk product is contained, as well as a flexible container, such as a liner bag, plastic or otherwise, which is then contained in a frame or similar to restrain it. The foil heater 1 in this case will sit against the flexible container 2, between it and any restraining frame, secondary container, or similar. In the preferred form the foil heater 1 lies underneath the full base area of the container 2 to be in the best thermal contact with the container 2 and therefore the material 3 contained therein. This thermal conductivity is enhanced due to the weight of the product and container pressing down onto the foil heater 1. In the preferred form the container is an intermediate bulk container 2 (IBC) that is common in the industry.

In the embodiment shown the foil heater 1 is substantially the same plan area as the underside of the container 2. This ensures uniform heating of the container 2 and its contents 3. In some embodiments it is sufficient to heat only the underside of the container 2 due to the rate of heating, and that once a thermal current is present then the lowest part of the container 2 typically has the coolest material.

However, the container 2 may also be cylindrical or other shape. In all these use scenarios the foil heater 1 may be formed to cover the area desired and conform to its shape, again this is preferably the lower or bottom area of the container 2. For example, where the container 2 is cylindrical then the foil heater 1 may be shaped to conform to the curved or circular bottom and may also have a circular component to cover the top. When the foil heater 1 is located on a side or other surface of the container 2, though less preferable, where it is not held in place by gravity, for example on the top or bottom of the container 2, then straps or other methods known in the art may be used to hold the foil heater to the required amount against the container, but this is not the preferred form or usage.

The foil heaters 1 are connected to a controller or energy source (not shown) to supply electricity to heat the container 2. In the most preferred use control of the heat from the foil heater 1 is by on-off energization control via the first thermostat 30 from within the foil heater 1. In this way the foil heater 1 is self-governing and once turned on, will control the heat into the product 3.

Figure 2:
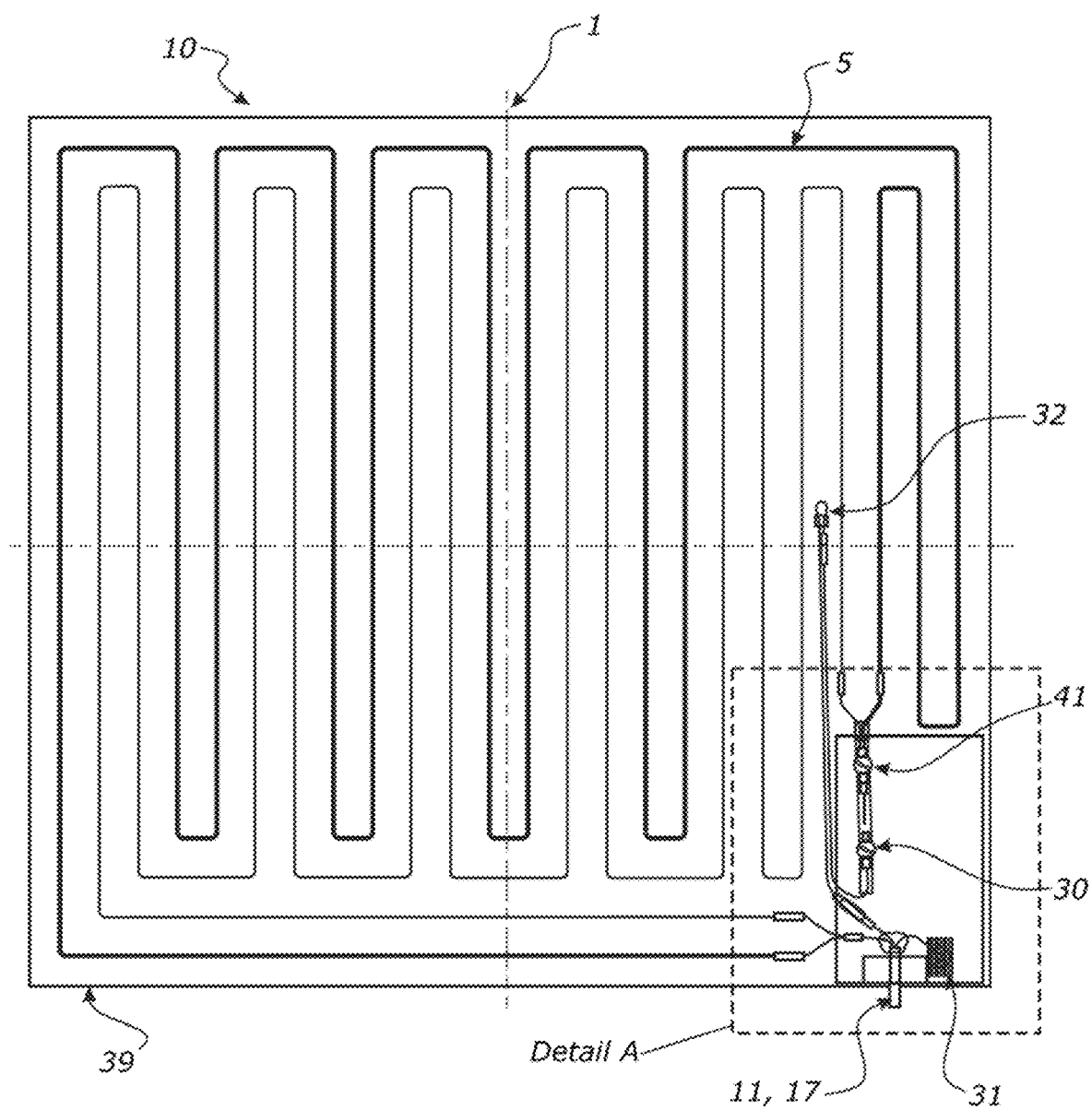
FIG. 2 shows a plan view of a typical foil heater layout, including the heating cable, product thermostat, backup thermostat, non-resetting thermal fuse, and electrical connection.

The general features of the foil heater 1 are visible in FIGS. 1 and 2, as is the electrical connection 11, in this case as a plug 16 which terminates a length of electrical power cord 17 which is connects the source of electrical energy (not shown) to the foil heater 1. The foil heater 1 has a periphery 10 and the electrical connection 11, via the electrical power cord 17 passes from external of the periphery 10 and the external environment to internally of the periphery 10. The foil heater 1 has a first external surface 4 and a second external surface 8. In the embodiment shown these are substantially planar in form, and in the orientation shown the first external surface 4 is upwardly presenting from the upper backing layer 42 and is the face that locates against the surface of the container, and the second external surface 8 is lowermost presenting, from the lower backing layer 39 and is the face that locates, for example against the pallet 14. As discussed, surfaces 4 and 8 could for example be curved, or become curved or similar to match the contours of the container 2 to be thermally. However, the foil heater is thin and flexible and so will also conform to the underside of the container 2 when located underneath.

Figure 11:
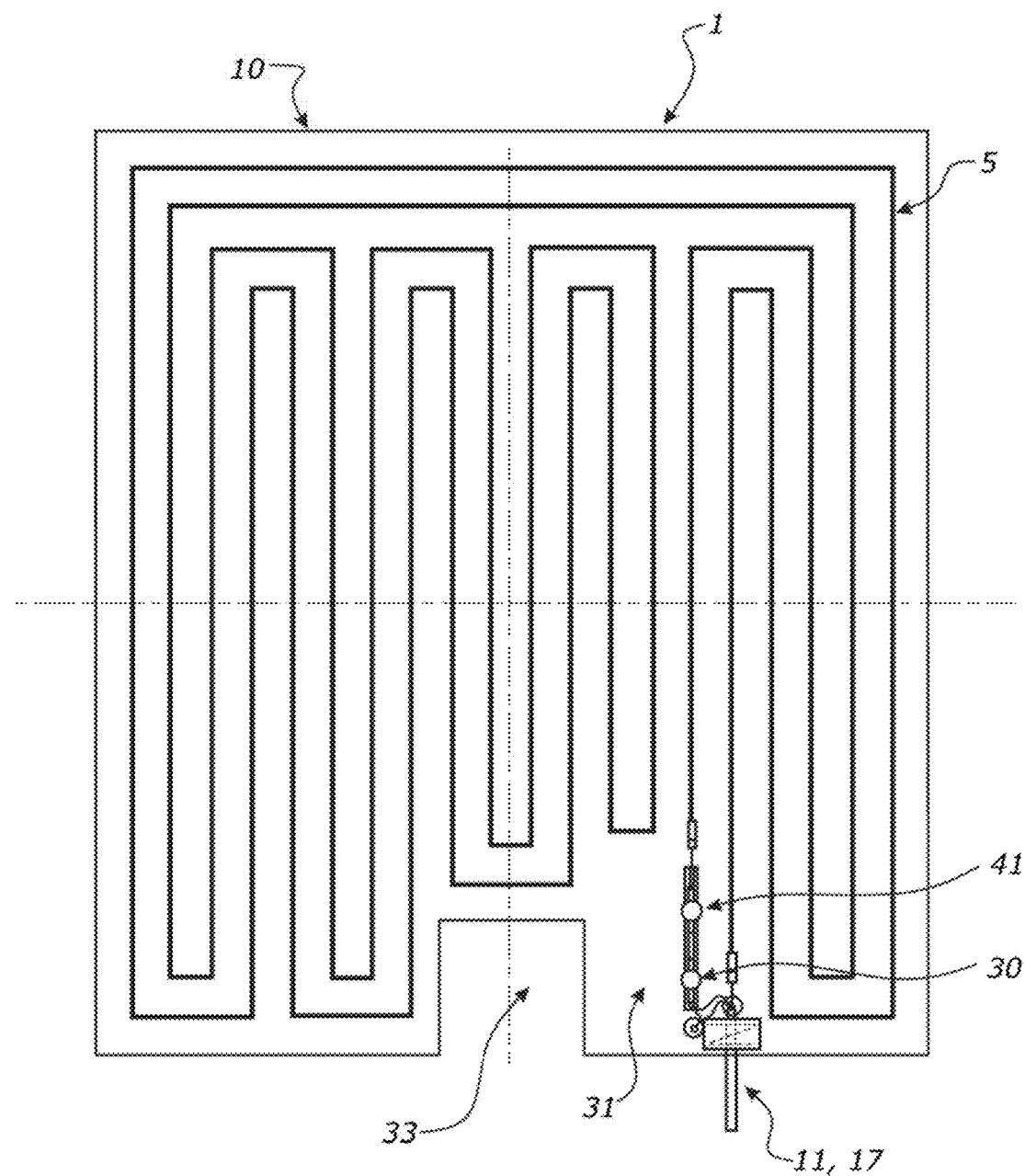
FIG. 11 shows a further variation of foil heater showing an alternative arrangement of thermostats, region of increased thermal resistance, and cold region also in keeping with the present invention.

A further arrangement of foil heater 1 and thermostats 30, 41, heating cable 5 and region of high thermal resistance 33 is shown in FIG. 11, where the same integers are for the same features.

The container 2 normally is of a standardized size, for example an intermediate bulk container 1 is normally a cubic meter in volume, being 1 meter high, by 1 meter wide and 1 meter deep, and therefore 1000 liters in volume. As such there is sufficient mass to form a high pressure between the underside (in this case) of the container 2 and the upward presenting major surface 4 of the or 1000 liters 1 and the heating cable 5. Application of pressure reduces the thermal resistance across the interfaces between the heating cable 5, any optional thermal spreading layers 18, upper backing payer 42 the container 2 and into the material 3.

Figure 3:
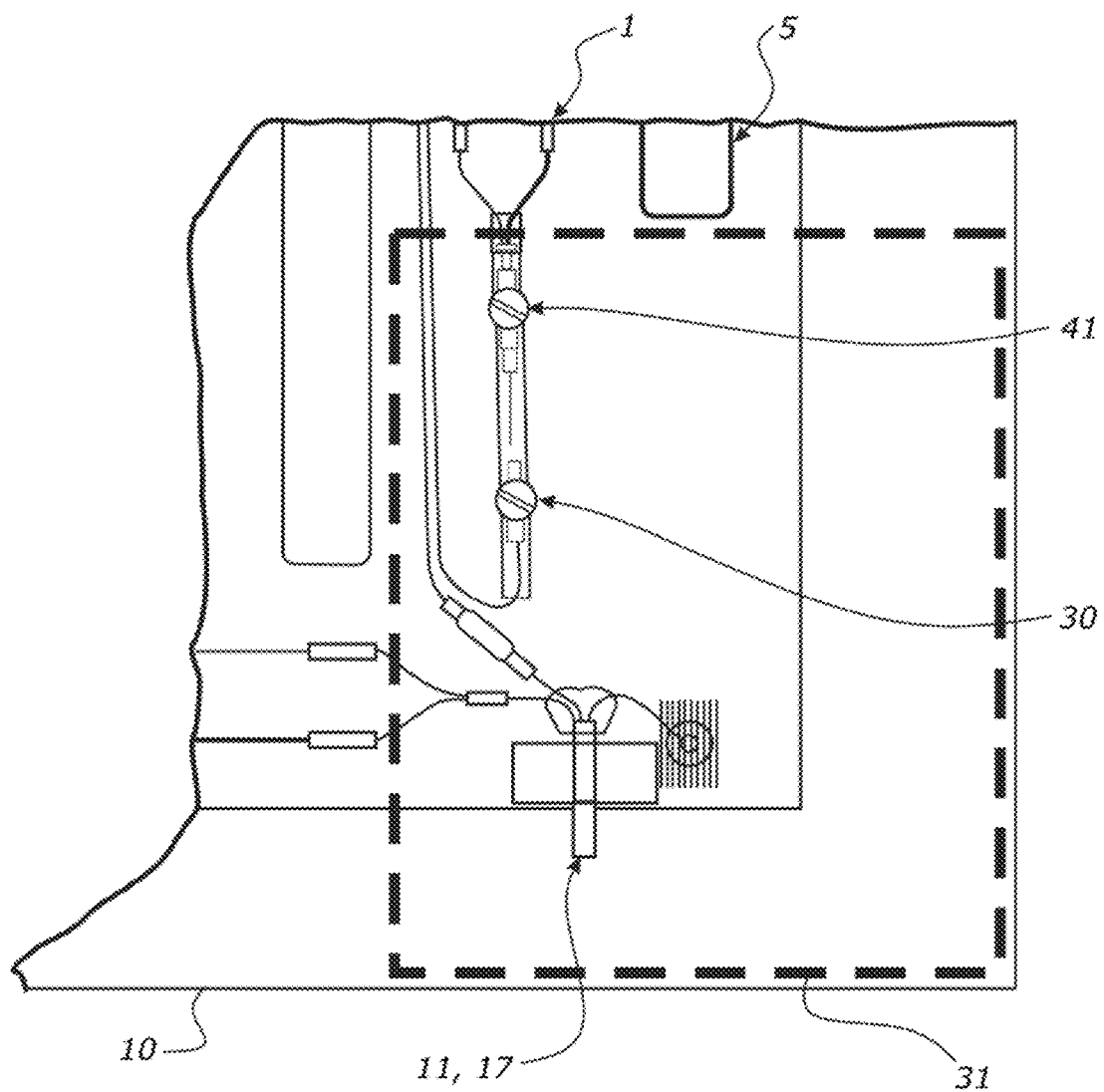
FIG. 3 shows the close up from Detail A of FIG. 1, indicating the cold region that can occur.

The internal components of the foil heater 1 are visible in FIGS. 2 and 3 which is a plan view as if the upper backing layer was removed. The upper backing layer 42 and lower backing layer 39 are formed from a thin flexible metallic foil sheet material. Preferably the sheet material is in the range of 0.04 mm to 0.05 mm thick, to form a foil heater that is approximately 0.15 mm thick away from any interior components (for example thermostats, fuses or heater cable).

As described above there is a cold region 31, or void in the foil heater 1 shown in FIG. 2 (with upper backing layer 32 removed for clarity) which has no heating cable 5 and in or toward which is located the product thermostat, and in detail in FIG. 3 (again with upper backing layer removed for clarity). In the embodiment shown the cold region 31 is in a corner of the foil heater 1. In the case of a full IBC, the product thermostat 30 in this cold region 31 will as described above measure the product temperature and is not directly influenced by heat from the heat cable. This does not present an issue in normal operation of heating a full container 2 using the foil heater 1. Also if the container 2 is completely empty then should by accident the foil heater 1 be energized, for example if left connected to the source or electrical energy after being emptied then the thermal fuse 32 will normally trip before any external temperatures of the foil heater 1 reach a dangerous temperature, beyond which damage, burning or fire may occur, that is, the mandated safety temperature.

However, if the container 2 still has a small layer of material 3 left in the container 2 and the foil heater 1 is left energized, then a situation can arise, as described, where the external temperature of the foil heater 1 can exceed the mandated safety temperature, preferably 90 degrees Celsius. This occurs due to the thermally conductive nature of the upper and lower backing layers, 42 and 39, extracting thermal energy away from the thermostat towards the cold region 31. As a result, the product thermostat 30 won't open and the foil heater 1 surfaces 4 and possibly 8 temperature will exceed the dangerous temperature, preferably 90° C.

Heat transfer to the "cold region" is supported by energy flow through the thin layer of product and through the foil heater upper and lower layers 42 and 39. Even though the combined thickness of the aluminum foil layers is around 0.15 mm maximum, which is relatively minor compared to the 25 mm layer of product, the high heat conductivity of aluminum compared to, for example water (as representative of the product) makes it a major "cold region" heat transfer contributor.

| Heat transfer aluminum foil versus water | | | |
|---|---|---|---|
| | Thickness (mm) | Heat conductivity (W/m*K) | Heat transfer rate (W/K) |
| Aluminium | 0.15 | 235 | 0.035 |
| Water | 25 | 0.6 | 0.015 |

Adding a region of high thermal resistance, for example a thermal break in the aluminum foil between the product thermostat 30 and the cold region, blocks heat transfer to the "cold region", reduces the energy transfer to the "cold region" enough to ensure a fast product thermostat response to pass the small residual product remaining test (also referred to as the one-inch water test by UL).

An increase in the thermal resistance in the foil heater 1 between the product thermostat 30 and the cold region 31 will reduce the flow of thermal energy into the cold region, sufficient for that region not to run away beyond the mandated safety temperature, instead the product thermostat will sense the temperature of the product, being heated by the heating cable 5.

The addition of a region of high thermal resistance 33 between the product thermostat 30 and backup thermostat 41 and the cold region 31 will slow the energy drain, resulting in a faster responding thermostat 30, which will open before a dangerous heater surface temperature (90° C.) is reached.

Several variations of providing a region of high thermal resistance, are now described, for example by use of a thermal break or similar between the product thermostat 30 and the cold region 31, are envisaged in the present invention.

Figure 4:
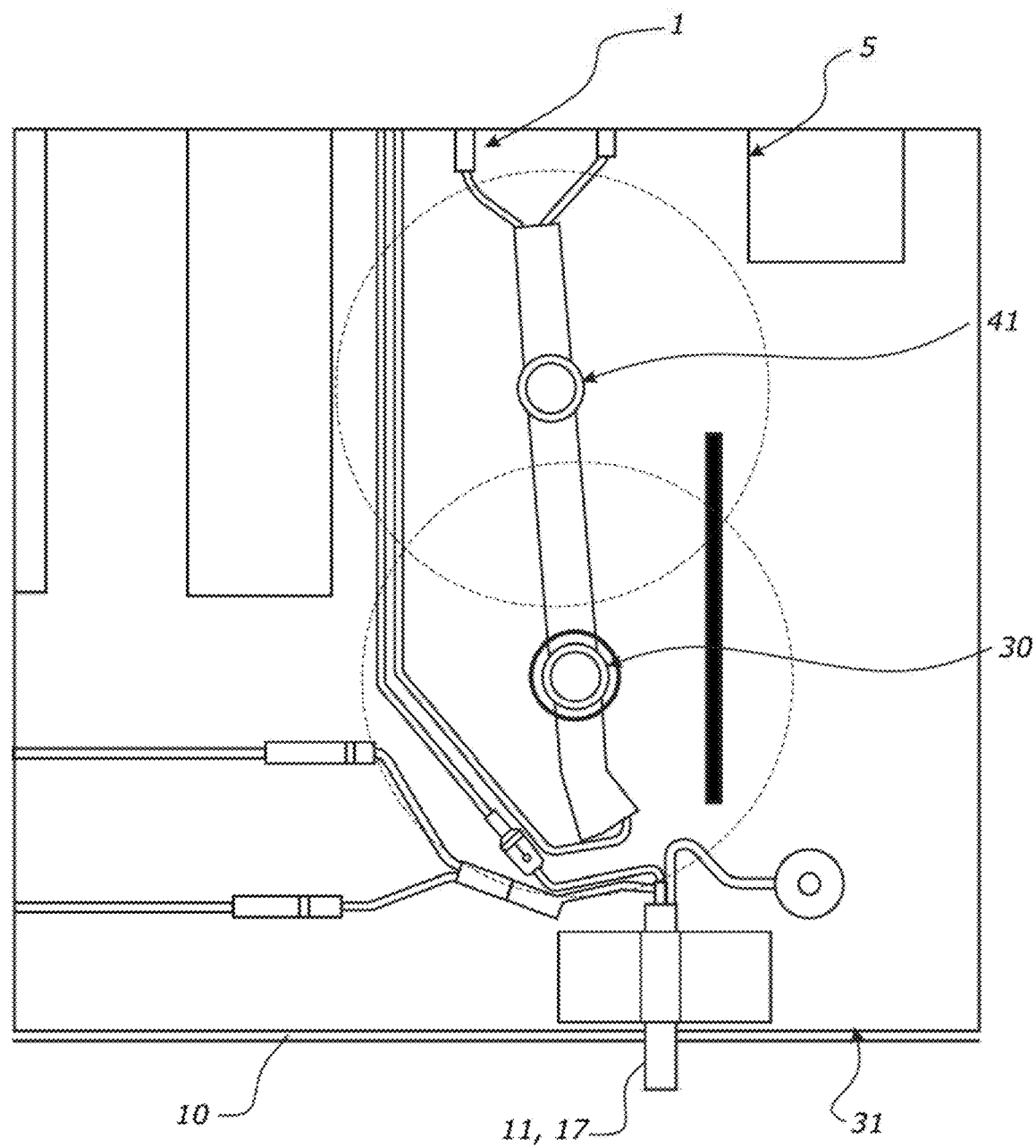
FIG. 4 shows a first embodiment of the invention to solve the cold corner problem, using a physical break as a cut out in the upper and lower encapsulation layers of the foil heater.
Figure 5:
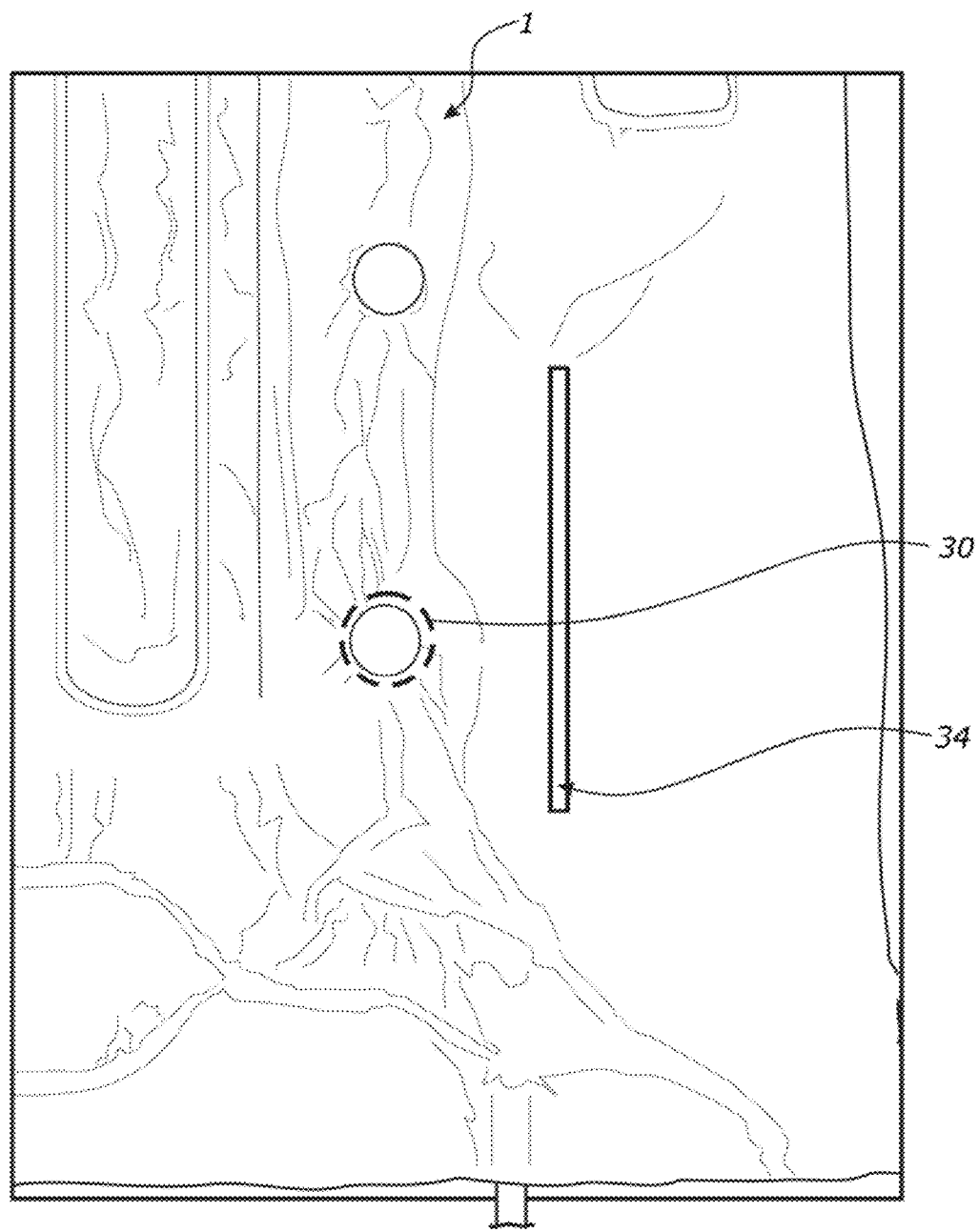
FIG. 5 shows a further view of the first embodiment of the invention to solve the cold corner problem, using a physical break as a cut out in the upper and lower encapsulation layers of the foil heater.
Figure 6:
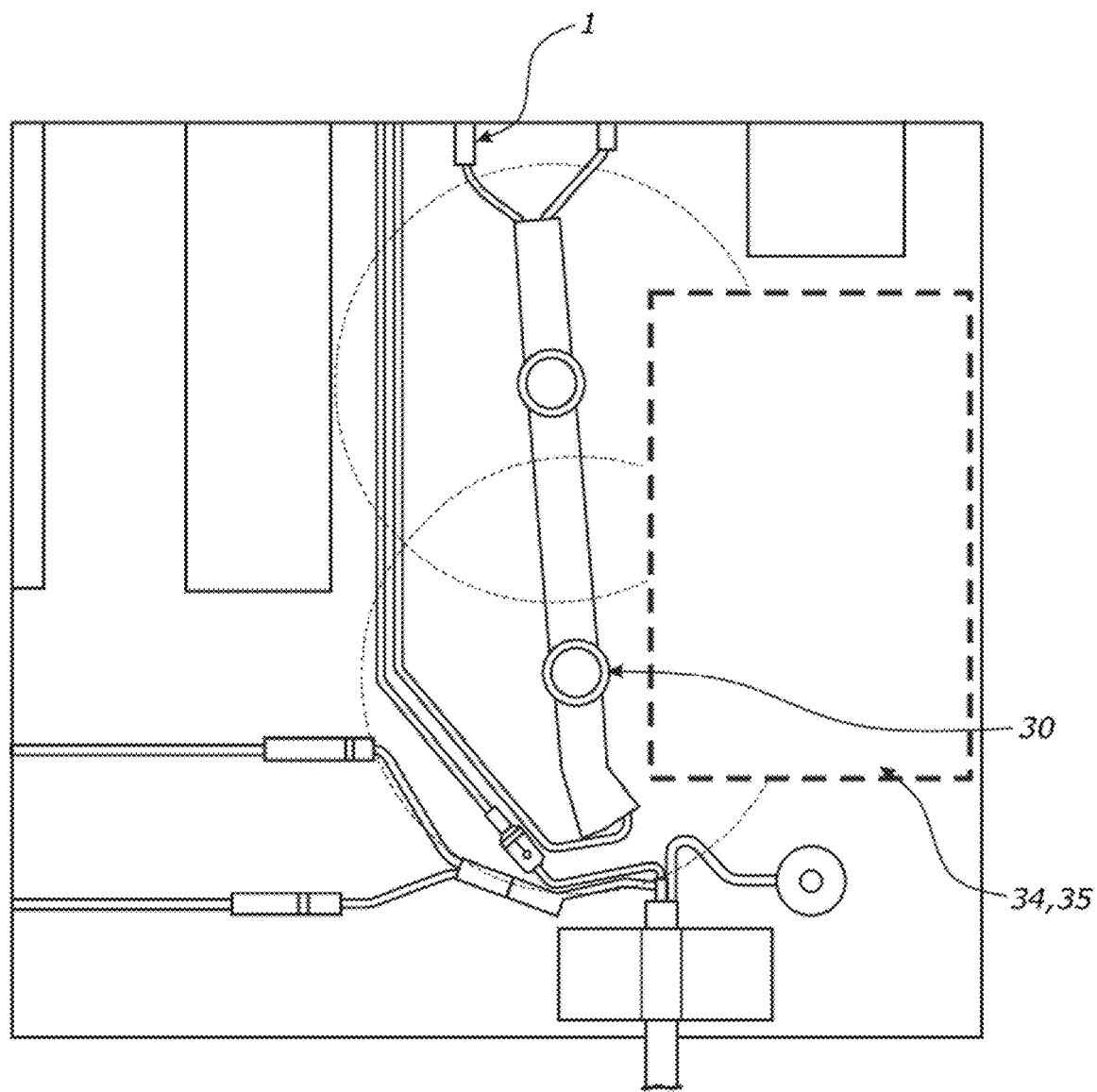
FIG. 6 shows a further variation of the first embodiment of the invention to solve the cold corner problem, using a physical removal of the upper and lower encapsulation layers of the foil heater.
Figure 7:
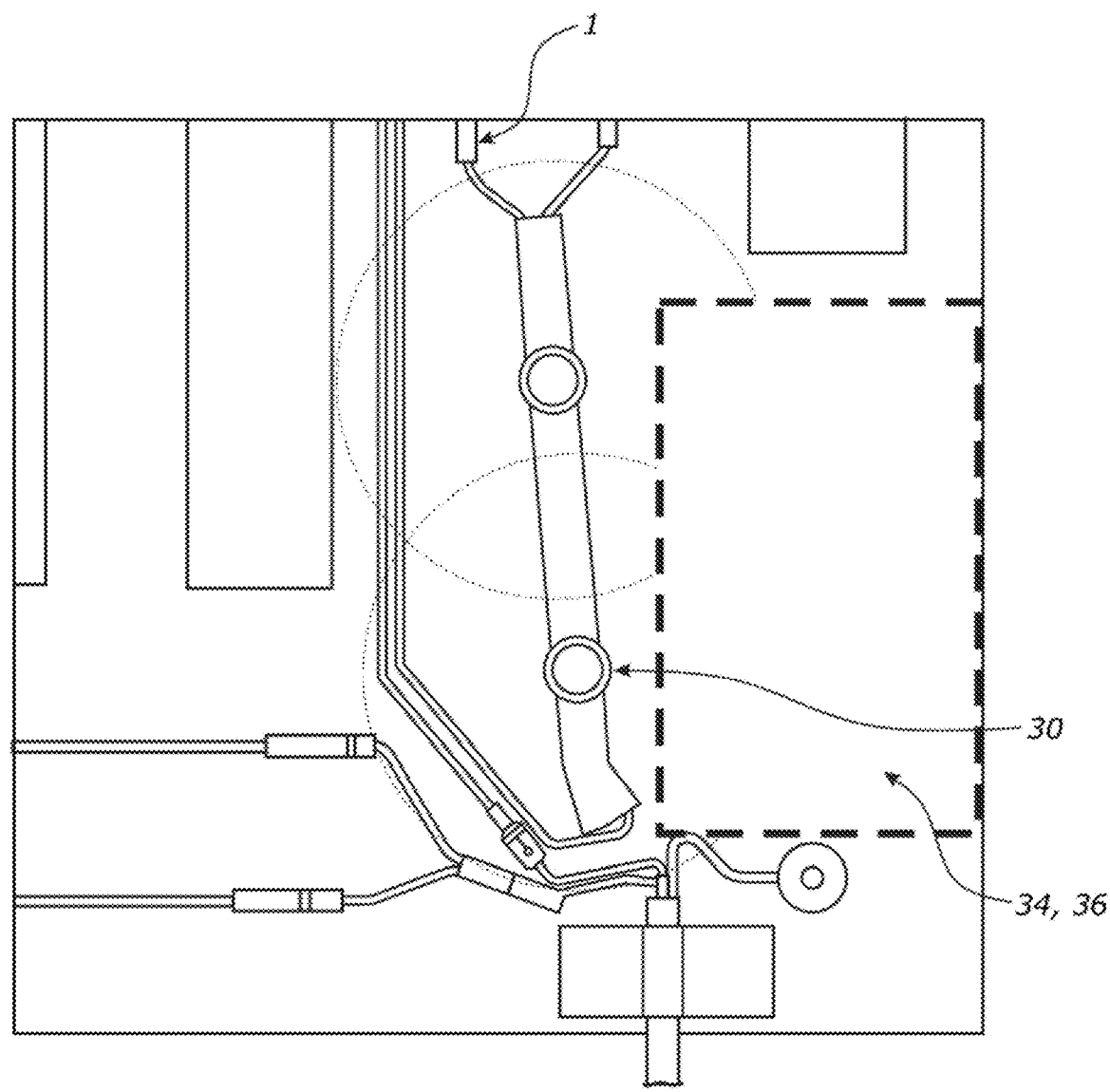
FIG. 7 shows a further variation of the first embodiment using an additional layer of insulation to prevent heat flow out to and out of the cold corner.

In one preferred form the increase in thermal resistance is a thermal break 34 that is an aperture or cut-out 35 through all the layers 39 and 42 of the foil heater 1 at least in part forming a thermal break between the product thermostat 30 and the cold region 31. This aperture may be wholly within the periphery 10 of the foil heater 1 such as shown in FIGS. 4 and 5, or may be a cut out and form part of the periphery 10, such as shown in FIG. 6. Typically, as an aperture 35 contained within the periphery, then it needs only to be a thin cut as shown in FIGS. 4 and 5. An aperture that is a full cut out as shown in FIG. 6 also removes the foil heater regions that are most likely to exceed the mandated safety temperature, thus eliminating the problem.

In other forms the thermal break 34 may be by way of added insulation 36 such as shown in FIG. 7 which again prevents the thermal energy moving to the external surface before at least the product thermostat 30 can control the heating process.

Figure 8:
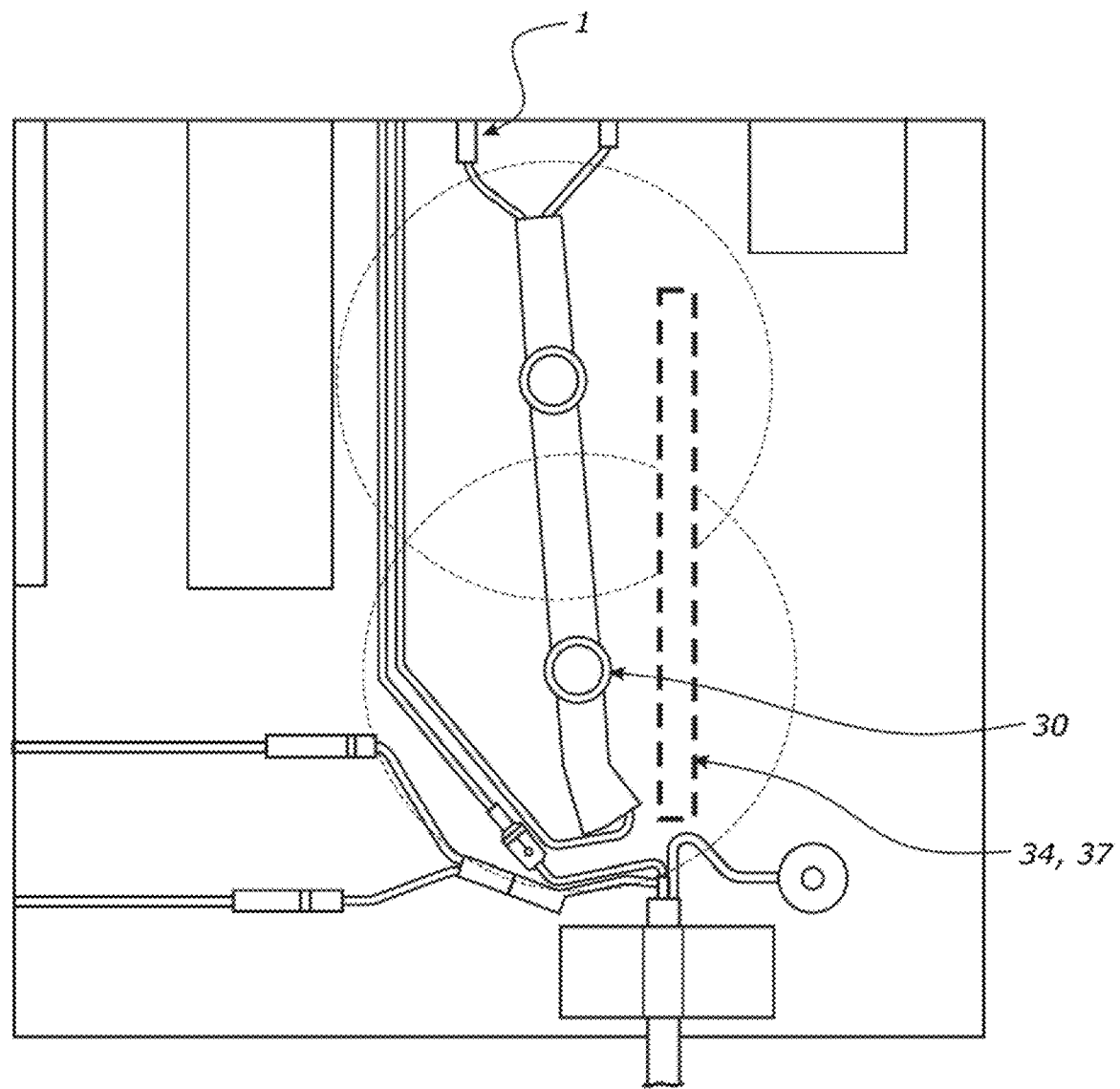
FIG. 8 shows a further variation of the first embodiment using a vertical barrier to prevent heat flow out to and out of the cold corner.

Another form of thermal break is that shown in FIG. 8 where a physical barrier 37, for example a 25 mm high ridge pushes the container 2 away from the foil heater 1, and prevents the thermal energy reaching the dangerous temperature before the product thermostat 30 can trip.

Figure 10:
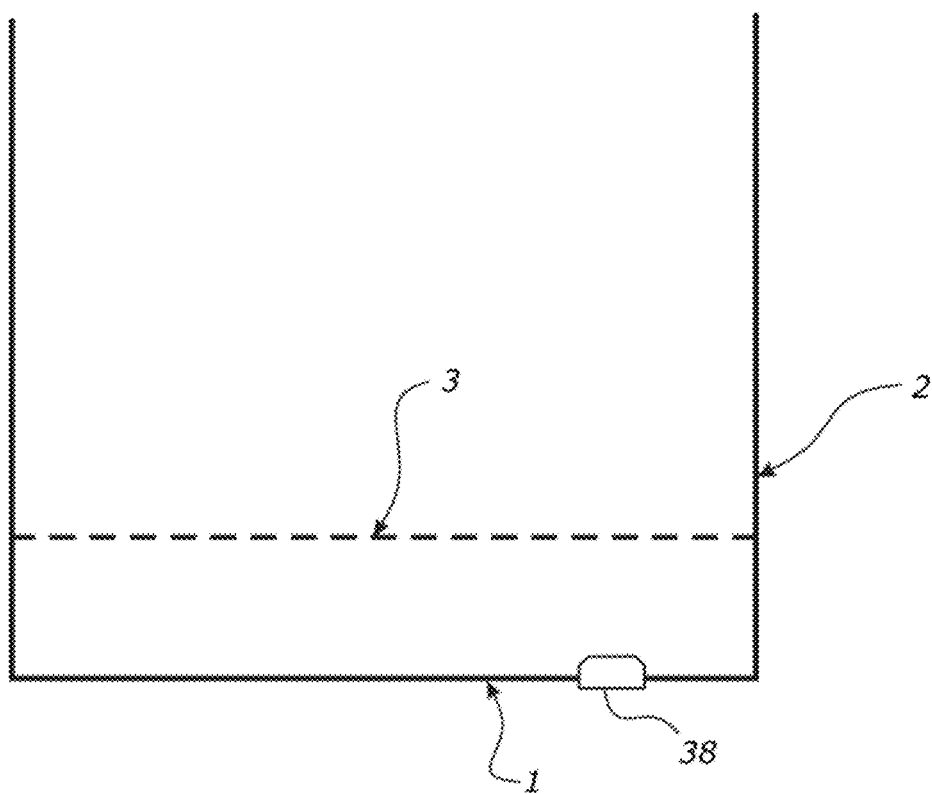
FIG. 10 shows a third embodiment to prevent the cold corner problem by adding a pressure switch to only allow flow of electricity to the foil heater when a certain weight is on the foil heater.

Another method of achieving the thermal break 34 is a pressure sensitive switch 38 as shown in FIG. 10. The switch 38 will only activate and supply the foil heater 1 with electrical energy when a sufficient pressure is located on it, that pressure representing the load that a sufficiently full container 2 presents that would absorb the thermal energy without the dangerous temperature being reached.

Figure 9:
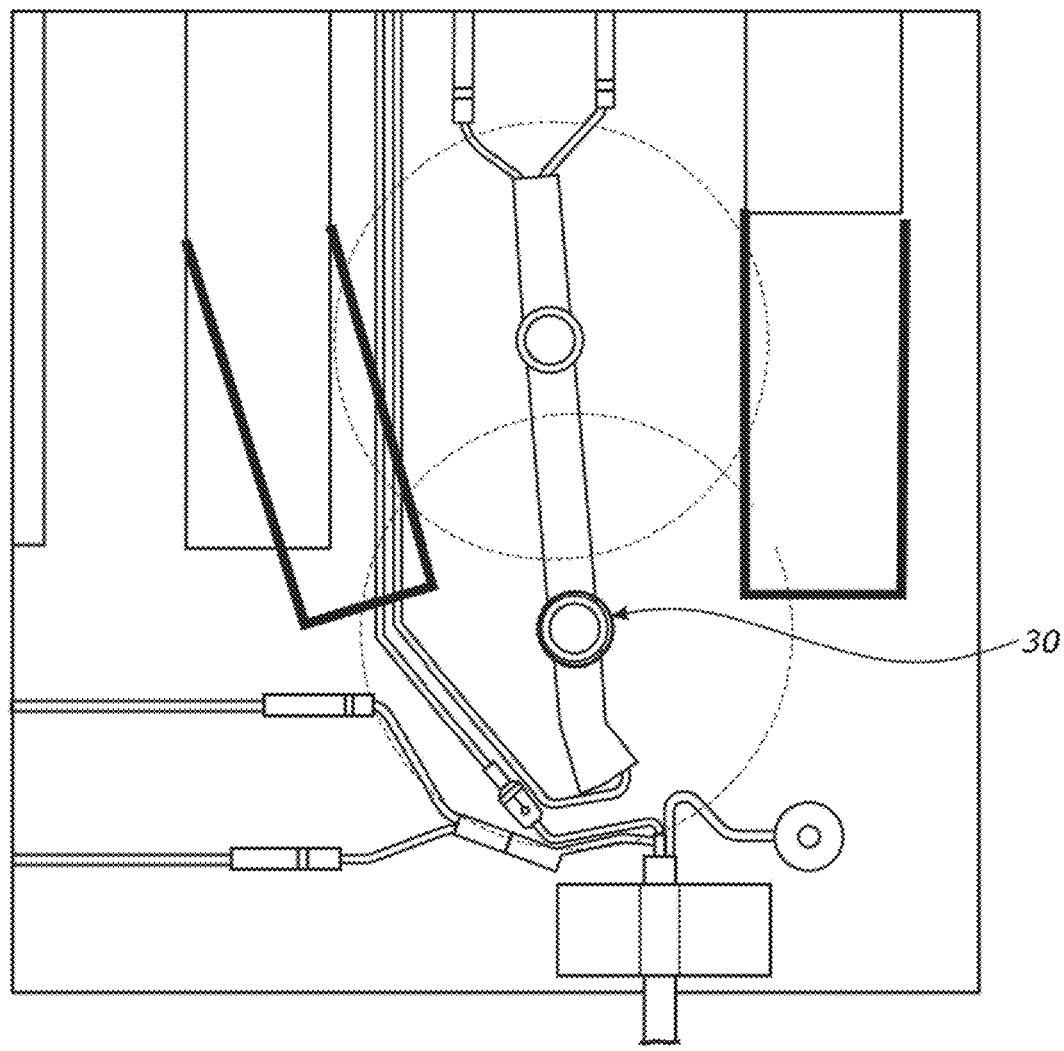
FIG. 9 shows a second embodiment to prevent the cold corner problem by moving and extending the heating cable closer to the thermostats.

A further example is shown in FIG. 9 where the heating cable 5 is located further into the cold area and is therefore sensed earlier by the thermostat to prevent the dangerous temperature. However, this has the disadvantage as described earlier of leading to premature tripping of the product thermostat 30.

Figure 12:
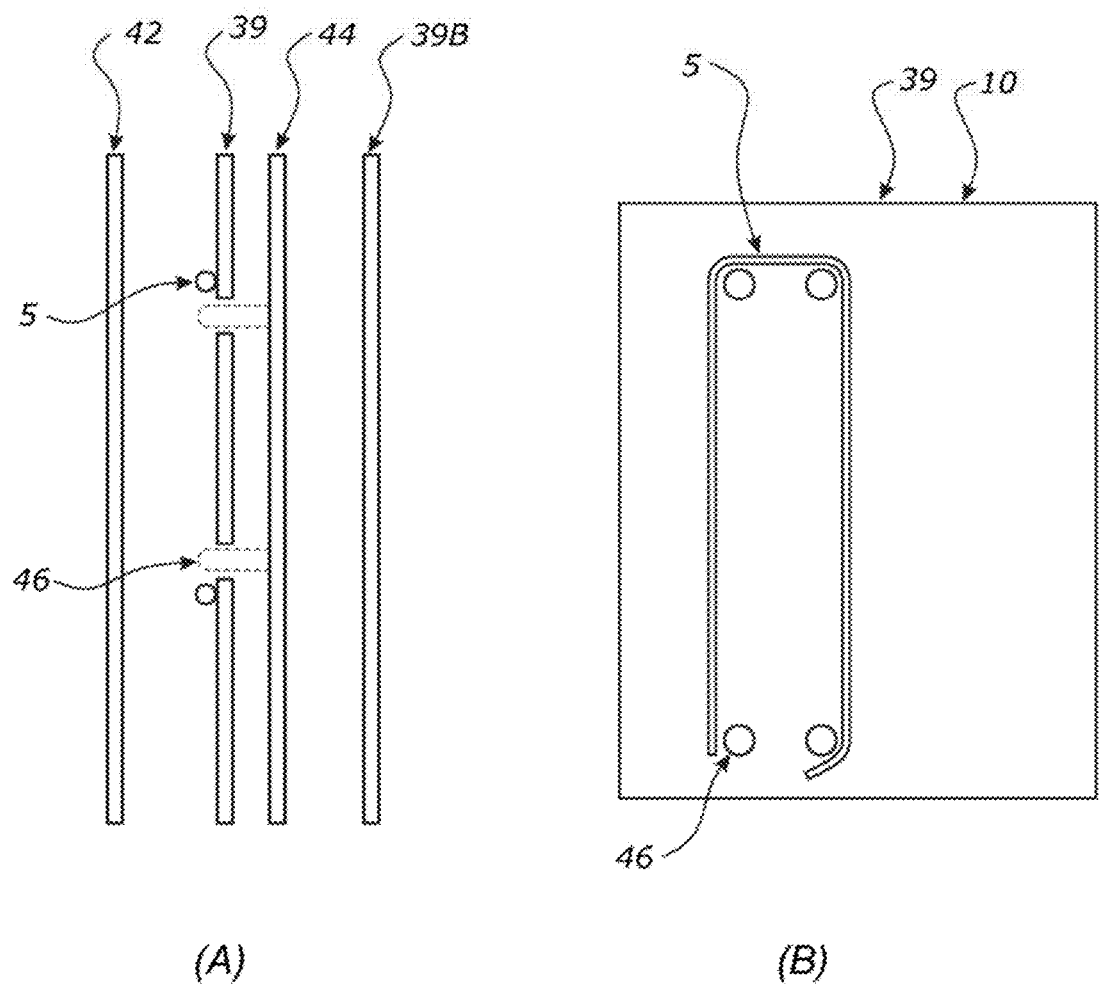
FIG. 12 shows at A an exploded side view of the arrangement of features for the method of manufacture of the foil heater, and at B a plan view.

The method of manufacture of the foil heater of the present invention is described below with reference to FIGS. 12A and 12B. A lower backing layer 39A has a jig 44 applied to it. The jig has several pins 46 marking the corner positions of where a heating cable is to be wrapped. In the form shown in FIG. 12 the pins 44 of the jig pierce the layer 39A. The heating cable is applied to the upper surface of layer 39A by wrapping the cable 5 around the pins 44 as shown in FIG. 12B to form the heating cable circuit equally spaced across the layer 39A similar to that shown in FIG. 2. The first thermostat, second thermostat and thermal fuse are located in place also and electrically connected to the heating cable in series. An external connection 11, 17 to allow for electrical connection is also provided and passed through a periphery of the lower backing layer to allow for an electrical connection to an external source of electricity for energizing the heating cable. An upper backing layer 42 is then located over the lower backing layer 39A to seal the heating cable therebetween, either the lower surface of the upper backing layer, or an upper surface of the lower backing layer having an adhesive coating. In the preferred form the underside of upper backing layer 42 has an adhesive pre-applied and is exposed by removing a backing layer prior to applying over the heating cable 5 and layer 39A. The jig 44 is then removed as the cable 5 is held in place by the upper and lower layers.

The cable is so arranged as to provide the cold region as earlier described, and a region of high thermal resistance as earlier described is also provided to prevent thermal energy from reaching the cold region until at least the first thermostat can reach the first set temperature when in use.

The holes left by the jig 44 are then covered by several small patches, one for each hole, or in the preferred form the underside of the layer 39A is also adhesively backed and this exposed after removal of the jig 44, and a further full lower backing layer 39B is applied to provide the foil heater.

One or more of the layers 42, 39A or 39B may be reinforced to prevent or reduce tearing, preferably by a scrim or similar material. In the preferred form it is at least layers 42 and 39 that are reinforced.

The edges are then folded to form the periphery, and in the preferred form the heating cable 5 is a flame resistant one.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to claims that follow.

The embodiments of the invention in which an exclusive property or privilege is claimed are defined as follows:

1. A foil heater to heat a material in a bulk container, comprising:

a lower backing layer of a metallic foil having substantially the same plan area as the underside of the bulk container to be heated;

a heating cable laid out on an upper facing surface of the lower backing layer to form a heating circuit to deliver thermal energy when connected to an external source of electricity, the heating cable equally spaced over the upper facing surface;

a first thermostat, which interrupts electricity to the heating cable when the first thermostat detects a temperature of the material above a first set temperature, and which re-connects electricity to the heating cable when the first thermostat detects the temperature is below the first set temperature, the first thermostat located away from the heating cable to not directly sense the thermal energy from the heating cable;

a second thermostat in series connection with the first thermostat, which interrupts electricity to the heating cable when the temperature detected is above a second set temperature;

a non-resetting thermal fuse in series connection with the first and second thermostat, which interrupts electricity to the heating cable when the temperature detected is above a third set temperature;

an upper backing layer of a metallic foil having substantially the same plan area as the underside of the bulk container to be heated, the lower backing layer and upper backing layer encapsulating the heating cable, first thermostat, second thermostat and non-resetting thermal fuse, and forming an interior between the upper backing layer and lower backing layer;

an electrical connection for the heating cable, after the first and second thermostat, to the external source of electricity, the electrical connection including an earth connection from any conductive material of the foil heater;

at least one cold region, the cold region defined by having no heating cable, first thermostat or second thermostat present; and at least one region of high thermal resistance between the first thermostat and the at least one cold region to prevent thermal energy from reaching the cold region until at least the first thermostat can reach the first set temperature.

2. The foil heater of claim 1, wherein the foil heater is configured such that when connected to the external source of electricity the foil heater will provide thermal energy to the container and any material therein within a range of amounts of material from full to empty.

3. The foil heater of claim 1, wherein the foil heater is configured such that when connected to the external source of electricity the foil heater will provide thermal energy within the container between the first and second set temperatures.

* * * * *